United States Patent [19]
Jeng et al.

[11] Patent Number: 5,772,485
[45] Date of Patent: Jun. 30, 1998

[54] METHOD OF MAKING A HYDROGEN-RICH, LOW DIELECTRIC CONSTANT GATE INSULATOR FOR FIELD EMISSION DEVICE

[75] Inventors: Shin-Puu Jeng, Plano; Bruce E. Gnade, Dallas, both of Tex.

[73] Assignee: Texas Instruments Incorporated, Dallas, Tex.

[21] Appl. No.: 821,128

[22] Filed: Mar. 20, 1997

Related U.S. Application Data

[62] Division of Ser. No. 625,051, Mar. 29, 1996, Pat. No. 5,684,356.

[51] Int. Cl.$^6$ .............................. H01J 9/00; H01J 19/24; H01J 9/38; C01B 3/00
[52] U.S. Cl. .............................. 445/24; 445/70; 445/50; 445/52; 313/336; 313/497; 313/552; 313/551; 252/188.25
[58] Field of Search ................................ 445/24, 70, 50, 445/52; 252/188.25; 313/310, 309, 336, 351, 495, 496, 497, 551, 552, 562

[56] References Cited

U.S. PATENT DOCUMENTS

| | | | |
|---|---|---|---|
| 3,755,704 | 8/1973 | Spindt et al. | 313/309 |
| 4,265,720 | 5/1981 | Winstel | 204/129 |
| 4,412,935 | 11/1983 | Plaettner et al. | 252/188.1 |
| 4,940,916 | 7/1990 | Borel et al. | 313/306 |
| 5,063,323 | 11/1991 | Longo et al. | 313/309 |
| 5,144,191 | 9/1992 | Jones et al. | 313/308 |
| 5,194,780 | 3/1993 | Meyer | 315/169.3 |
| 5,225,820 | 7/1993 | Clerc | 340/752 |
| 5,283,500 | 2/1994 | Kockanski | 315/58 |
| 5,442,255 | 8/1995 | Ise et al. | 313/495 |
| 5,453,659 | 9/1995 | Wallace et al. | 313/495 |
| 5,549,934 | 8/1996 | Garza et al. | 427/489 |

*Primary Examiner*—Ponnathapura Achutamurthy
*Assistant Examiner*—Padmashri Ponnaluri
*Attorney, Agent, or Firm*—Christopher L. Maginniss; W. James Brady, III; Richard L. Donaldson

[57] ABSTRACT

An emitter structure 12 for use in a field emission display device comprises a ballast layer 17 overlying an electrically conductive coating 16 (cathode electrode), which is itself formed on an electrically insulating substrate 18. A gate electrode comprises a coating of an electrically conductive material 22 which is deposited on an insulating layer 20. Cone-shaped microtips 14 formed within apertures 34 through conductive layer 22 and insulating layer 20. In the present invention, insulating layer 20 comprises a dielectric material capable of desorbing at least ten atomic percent hydrogen, which may illustratively comprise hydrogen silsesquioxane (HSQ). HSQ is an abundant source of hydrogen which keeps deleterious oxides from forming on microtip emitters 14. HSQ also reduces the capacitance formed by cathode electrode 16 and gate electrode 22, since its relative dielectric constant is less than 3.5. In alternative embodiments, the gate insulation layer 20 additionally includes one or more sublayers of a more dense insulating material 20b and 20c, typically a plasma deposited silicon dioxide.

9 Claims, 2 Drawing Sheets

5,772,485

METHOD OF MAKING A HYDROGEN-RICH, LOW DIELECTRIC CONSTANT GATE INSULATOR FOR FIELD EMISSION DEVICE

This is a division of application Ser. No. 08/625,051, filed Mar. 29, 1996, now U.S. Pat. No. 5,684,356.

TECHNICAL FIELD OF THE INVENTION

The present invention relates generally to field emission flat panel display devices and, more particularly, to a structure and method for maintaining the cleanliness of microtip emitters within such a device, while also permitting reduced power consumption and improved gray scale capability due to lower RC time constants.

BACKGROUND OF THE INVENTION

Advances in field emission display technology are disclosed in U.S. Pat. No. 3,755,704, "Field Emission Cathode Structures and Devices Utilizing Such Structures," issued 28 Aug. 1973, to C. A. Spindt et al.; U.S. Pat. No. 4,940,916, "Electron Source with Micropoint Emissive Cathodes and Display Means by Cathodoluminescence Excited by Field Emission Using Said Source," issued 10 Jul. 1990 to Michel Borel et al.; U.S. Pat. No. 5,194,780, "Electron Source with Microtip Emissive Cathodes," issued 16 Mar. 1993 to Robert Meyer; and U.S. Pat. No. 5,225,820, "Microtip Trichromatic Fluorescent Screen," issued 6 Jul. 1993, to Jean-Frédéric Clerc. These patents are incorporated by reference into the present application.

In order for a field emission display device to operate efficiently, it is necessary to maintain a good vacuum within the cavity of the device, typically on the order of $10_{-7}$ torr. The cavity is pumped out and degassed before assembly, but over time the pressure in the display builds up due to outgassing of the components inside the display and to the finite leak rate of the atmosphere into the cavity. As the pressure increases, efficiency of the electron emission from the tip and phosphor luminescence decreases. Clearly, even the slightest leak rate or outgassing rate severely impacts a vacuum pressure level of $10^{-7}$ torr within the small volume cavity of a flat panel display.

In evacuated display devices, getters are employed for adsorbing gases which are generated by components and gases which leak in from the atmosphere, so as to maintain a minimum pressure in the vacuum panel assembly. Frequently, the getter is placed mostly in peripheral regions of the display device, generally in the inactive regions between the front panel and the cathode outside of the screen area. As an example, in the apparatus disclosed in U.S. Pat. No. 5,063,323, "Field Emitter Structure Providing Passageways for Venting of Outgassed Materials from Active Electronic Area," issued 5 Nov. 1991, to R. T. Longo et al., outgassed materials liberated in spaces between pointed field emitter tips and an electrode structure are vented through passageways to a pump or gettering material provided in a separate space.

If a getter is to be positioned outside the active display area, the inactive external area must be dimensionally increased, which, as a consequence, substantially reduces the effective display area. This arrangement also has the disadvantage of a diminution of the gas adsorption effect at the center of the display screen, contributing to deterioration of the image quality. Since the FED has so little extra space inside the display cavity, there is no room for large pieces of conventional getter material. Without getter material to help maintain the vacuum, the useful lifetime of the display is reduced.

U.S. Pat. No. 5,283,500, "Flat Panel Field Emission Display Apparatus," issued 1 Feb. 1994, to G. P. Kochanski, discloses active gettering devices comprising micropoints fabricated from one of the known getter metals. Evaporation of getter material occurs as a result of a potential which is selectively applied between the getter micropoint and the associated gate electrode. This approach, in which the evaporated getter metal is deposited on the anode, is deemed deleterious to the phosphor material, and it is expected that the deposited getter will eventually result in significant deterioration of the display luminosity.

U.S. Pat. No. 5,453,659, "Anode Plate for Flat Panel Display Having Integrated Getter," issued 26 Sep. 1995, to R. M. Wallace et al., disclose a structure and method for providing improved gettering within such a field emission flat panel display device by use of an integrated, thin-film getter material on the anode plate which can be selectively activated. The teachings of this patent, while effective to distribute getter material over the active region of the display, require additional lithography steps to implement.

One of the key functions performed by a getter in a field emission display device is the adsorption of oxygen gas which may collect on the microtip emitters and form oxides thereon. For the performance of this function, it is vital that the gettering material be distributed over the entire active region of the panel and in close proximity to the microtips. It does not appear that such an arrangement exists in the prior art.

In view of the above, it is clear that there exists a need for a flat panel display device having the capability of maintaining the cleanliness of the microtip emitters and wherein the implementation of this capability is simple and inexpensive.

SUMMARY OF THE INVENTION

In accordance with the principles of the present invention, there is disclosed herein an electron emission apparatus which comprises a first conductive layer, and an insulating layer over the first conductive layer, the insulating layer comprising a dielectric material capable of desorbing at least ten atomic percent hydrogen. The apparatus further comprises a second conductive layer on the insulating layer, the second conductive layer having a plurality of apertures extending therethrough and through the insulating layer, and microtip emitters on the first conductive layer, each emitter formed within a corresponding aperture in the second conductive layer.

In accordance with a preferred embodiment of the present invention, the insulating layer comprises hydrogen silsesquioxane (HSQ). In accordance with another embodiment of the present invention, the insulating layer comprises a first insulating sublayer of a dielectric material capable of desorbing at least ten atomic percent hydrogen and a second, relatively thinner insulating sublayer of silicon dioxide. In accordance with still another embodiment of the present invention, the insulating layer comprises an insulating sublayer of a dielectric material capable of desorbing at least ten atomic percent hydrogen sandwiched between two relatively thinner insulating sublayers of silicon dioxide.

Further in accordance with the principles of the present invention, there is disclosed herein an electron emission display apparatus comprising an emitter structure and a display panel having a substantially planar face opposing the emitter structure. The emitter structure includes an insulating substrate, a first conductive layer on the insulating substrate, and an insulating layer over the first conductive layer, the insulating layer comprising a dielectric material capable of desorbing at least ten atomic percent hydrogen. The emitter structure further includes a second conductive layer on the insulating layer, the second conductive layer having a plurality of apertures extending therethrough and through the insulating layer, and microtip emitters on the first conductive layer, each emitter formed within a corresponding aperture in the second conductive layer. The display panel includes a substantially transparent substrate, a transparent anode electrode on the transparent substrate, and luminescent material overlying the anode electrode.

Further in accordance with the principles of the present invention, there is disclosed herein a method of fabricating an emitter plate for use in a field emission device, the method comprising the steps of providing a substrate having a first conductive layer patterned on a surface thereof, providing an insulating layer over the first conductive layer, the insulating layer comprising a dielectric material capable of desorbing at least ten atomic percent hydrogen, and depositing a second conductive layer on the insulating layer. The method additionally comprises the steps of forming a plurality of apertures in the second conductive layer and extending through the insulating layer, and forming microtip emitters on the first conductive layer, each emitter formed within a corresponding aperture in the second conductive layer.

Further in accordance with the principles of the present invention, there is disclosed herein a method of controlling the partial pressure of gases within a substantially evacuated cavity of a device, the cavity formed between first and second substrates which are sealed at peripheral regions thereof, one of the first and second substrates including a layer of a dielectric material capable of desorbing at least ten atomic percent hydrogen, the method comprising the step of heating the device to cause the release of hydrogen from the layer of dielectric material.

BRIEF DESCRIPTION OF THE DRAWINGS

The foregoing features of the present invention may be more fully understood from the following detailed description, read in conjunction with the accompanying drawings, wherein.

DESCRIPTION OF THE PREFERRED EMBODIMENTS

Figure 1:
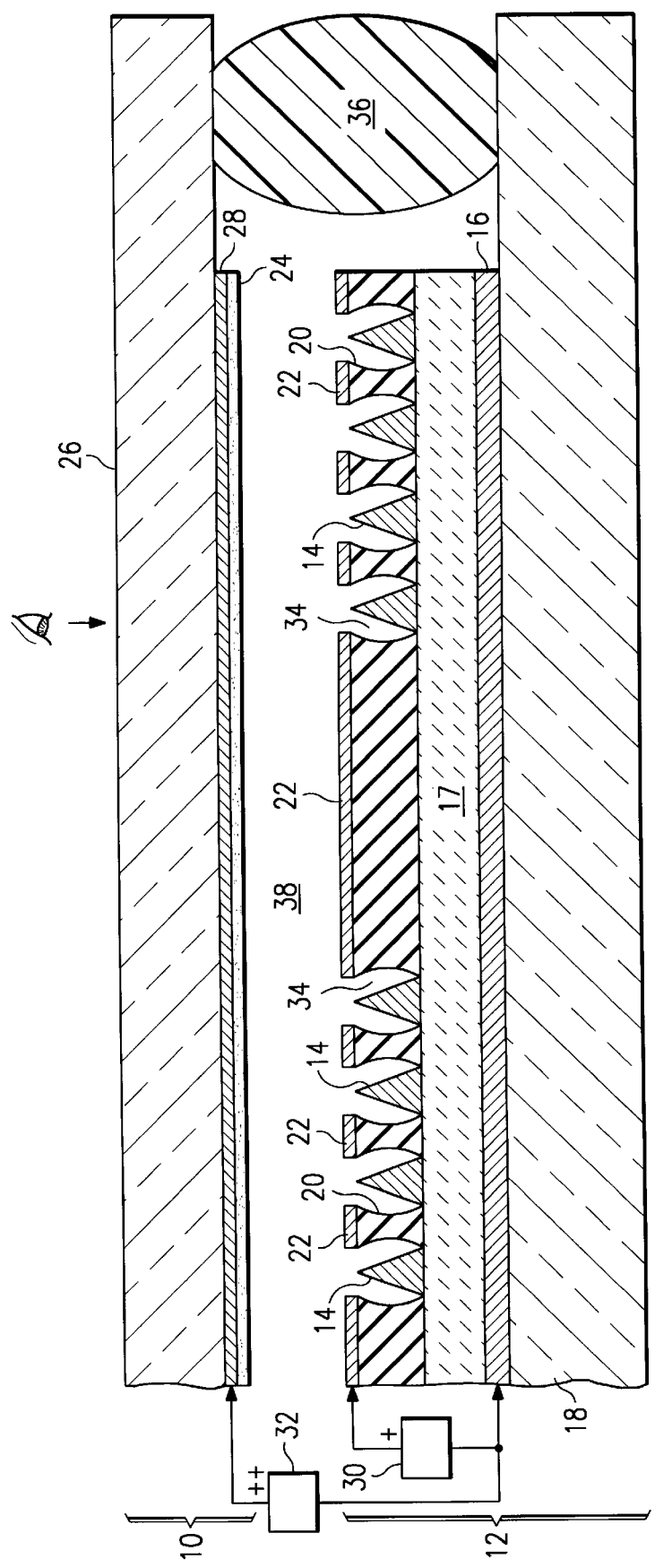
FIG. 1 illustrates in cross section a portion of a field emission flat panel display device including a hydrogen-rich, low dielectric constant gate insulation layer in accordance with the present invention.

Referring initially to FIG. 1, there is shown, in cross-sectional view, a portion of an illustrative field emission flat panel display device which includes a gate insulation layer in accordance with the present invention. In this embodiment, the field emission display device comprises an anode portion having an electroluminescent phosphor coating facing a cathode portion, the phosphor coating being observed from the side opposite to its excitation.

More specifically, the field emission display device of FIG. 1 comprises a cathodoluminescent anode structure 10 and an emitter, or cathode, structure 12. Cathode structure 12 comprises a plurality of electrically conductive microtips 14 seated on a ballast layer 17, which overlies an electrically conductive coating 16, which is itself formed on an electrically insulating substrate 18. Ballast layer 17 is illustratively fabricated of amorphous silicon, and substrate 18 is illustratively soda-lime glass.

A gate electrode comprises a coating of an electrically conductive material 22 which is deposited on an insulating layer 20. Microtips 14 take the shape of cones which are formed within apertures 34 through conductive layer 22 and insulating layer 20. The thicknesses of gate electrode coating 22 and insulating layer 20 are chosen in such a way that the apex of each microtip 14 is substantially level with the electrically conductive gate electrode coating 22. Conductive coating 22 may be in the form of a continuous coating across the surface of substrate 18; alternatively, it may comprise conductive bands across the surface of substrate 18. Conductive coating 22 forms a substantially planar surface on cathode structure 12.

Anode structure 10 comprises an electrically conductive film 28 deposited on a transparent planar support 26 which is positioned facing gate electrode 22 and parallel thereto, the conductive film 28 being deposited on the surface of support 26 directly facing gate electrode 22. Conductive film 28 may be in the form of a continuous coating across the surface of support 26 as shown in FIG. 1; alternatively, it may be in the form of electrically isolated stripes comprising three series of parallel conductive bands across the surface of support 26, as taught in U.S. Pat. No. 5,225,820, to Clerc. By way of example, a suitable material for use as conductive film 28 may be indium-tin-oxide (ITO), which is optically transparent and electrically conductive.

Anode structure 10 also comprises a cathodoluminescent phosphor coating 24, deposited over conductive film 28 so as to be directly facing and immediately adjacent gate electrode 22. Phosphor coating 24 forms a substantially planar surface on anode structure 10. In the Clerc patent, the conductive bands of each series are covered with a phosphor coating which luminesces in one of the three primary colors, red, blue and green.

Anode 10 and cathode 12 are maintained at a fixed distance from one another by a plurality of spacers (not shown) which may typically comprise glass columnar members distributed across the active region of the display. Anode structure 10 and cathode structure 12 are sealed together at peripheral portions thereof by a sealing material 36, illustratively comprising a glass frit rod.

All or selected groupings of microtip emitters 14 of the above-described structure are energized by applying a negative potential to layer 16, functioning as the cathode electrode, relative to the gate electrode 22, via voltage source 30, thereby inducing an electric field which draws electrons from the apexes of microtips 14. The emitted electrons are accelerated toward the anode plate 10 which is positively biased by the application of a substantially larger positive voltage from voltage source 32 coupled to conductive film 28 functioning as the anode electrode. Energy from the electrons attracted to the anode conductive film 28 is transferred to particles of the phosphor coating 24, resulting in luminescence. The electron charge is transferred from phosphor coating 24 to conductive film 28, completing the electrical circuit to voltage source 32.

In accordance with the present invention, insulating layer 20 comprises a dielectric material capable of desorbing hydrogen. A preferred material for insulating layer 20 may illustratively comprise hydrogen silsesquioxane, whose chemical formula is $SiO_{1.5}H$, and which is popularly abbreviated as HSQ. HSQ is an abundant source of hydrogen, which, when present in the panel cavity 38 at a specified minimum partial pressure in relation to the partial pressure of the oxygen in cavity 38, keeps deleterious oxides from forming on microtip emitters 14. HSQ has one atom of hydrogen per three-and-one-half total atoms; it is therefore seen that HSQ is capable of desorbing more than twenty-eight atomic percent hydrogen. Another advantage of using a hydrogen desorption material as insulating layer 20 is the close physical proximity of the gate insulating layer 20 to the microtip emitters 14.

HSQ also reduces the capacitance formed by cathode electrode 16 and gate electrode 22, since its relative dielectric constant is less than 3.5, while the relative dielectric constant of silicon dioxide ($SiO_2$), typically used as the gate insulating material in the prior art, is greater than 4.0. As a result, the RC time constant of cathode structure 12 is reduced, permitting improved gray scale capability of the display when operating in a pulse width modulated row-and-column addressing scheme. The reduction in capacitance provided by the use of HSQ also reduces the capacitive power dissipation between cathode electrode 16 and gate electrode 22.

Figure 2:
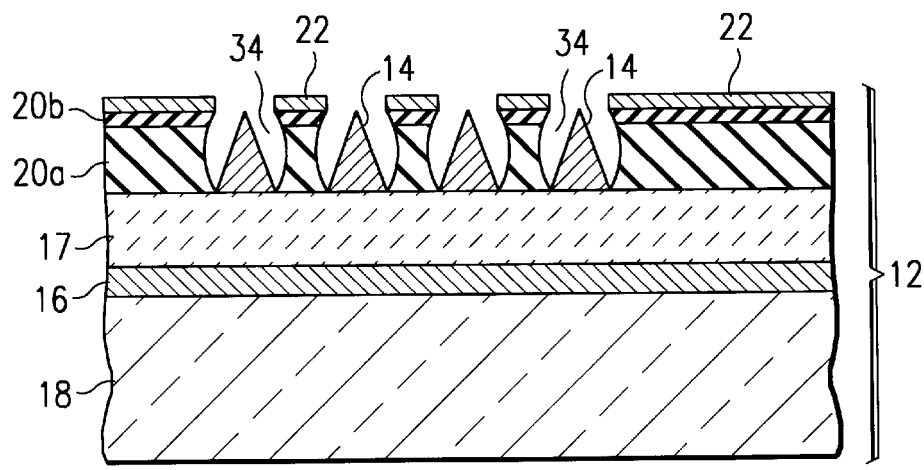
FIGS. 2 through 4 illustrate alternative embodiments of the gate insulation layer of the flat panel display device of FIG. 1.
Figure 3:
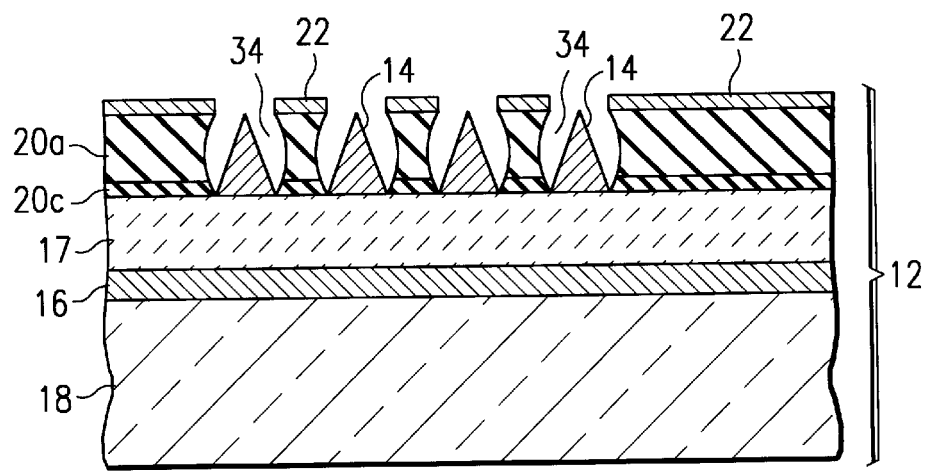
Figure 4:
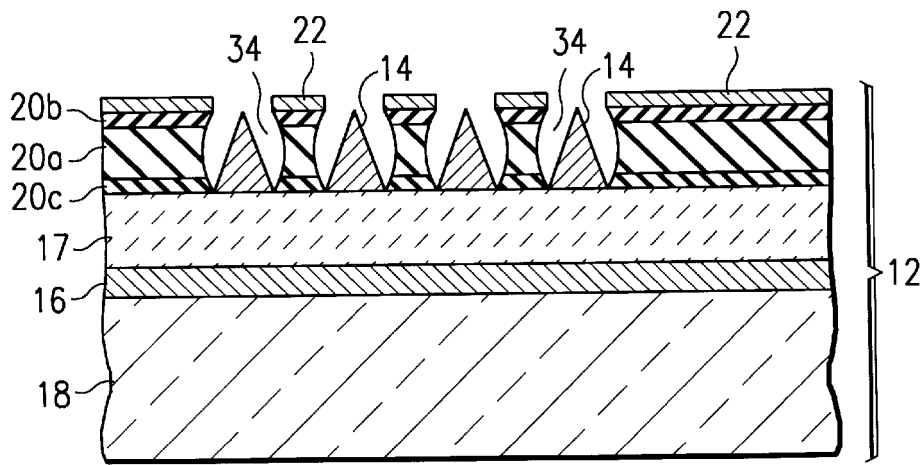

FIGS. 2 through 4 illustrate alternative embodiments of the gate insulation layer of the flat panel display device of FIG. 1, which embodiments serve to remedy a potential cracking problem which HSQ may exhibit during its curing stage. This problem may be overcome by forming the gate insulating layer as two or more sublayers. In the embodiment of FIG. 2, the bottom sublayer 20a of the gate insulating layer comprises a dielectric material capable of desorbing at least ten atomic percent hydrogen, typically HSQ, and the upper sublayer 20b, which is relatively thinner than bottom sublayer 20a, comprises a more dense insulating material, typically a plasma deposited silicon dioxide. In this example, the thickness of sublayer 20a may illustratively be 0.1 to 2.0 $\mu$meters, and the thickness of sublayer 20b may illustratively be 0.01 to 1.0 $\mu$meters, with the overall thickness of layer 20 illustratively being about 0.1 to 3.0 $\mu$meters.

In the embodiment of FIG. 3, the top sublayer 20a of the gate insulating layer comprises a dielectric material capable of desorbing at least ten atomic percent hydrogen, typically HSQ, and the bottom sublayer 20c, which is relatively thinner than upper sublayer 20a, comprises a more dense insulating material, typically a plasma deposited silicon dioxide. In this example, the thickness of sublayer 20a may illustratively be 0.1 to 2.0 $\mu$meters, and the thickness of sublayer 20c may illustratively be 0.01 to 1.0 $\mu$meters, with the overall thickness of layer 20 illustratively being about 0.1 to 3.0 $\mu$meters.

In the embodiment of FIG. 4, the gate insulating layer is formed as three sublayers. The middle sublayer 20a comprises a dielectric material capable of desorbing at least ten atomic percent hydrogen, typically HSQ, and the top and bottom sublayers 20b and 20c, respectively, which are both relatively thinner than middle sublayer 20a, comprise a more dense insulating material, typically a plasma deposited silicon dioxide. In this example, the thickness of sublayer 20a may illustratively be 0.1 to 2.0 $\mu$meters, and the thicknesses of sublayers 20b and 20c may each illustratively be 0.01 to 0.5 $\mu$meters, with the overall thickness of layer 20 illustratively being about 0.1 to 3.0 $\mu$meters.

Of course, the various arrangements of sublayers 20a, 20b and 20c shown in FIGS. 2–4 which comprise insulating layer 20 are merely illustrative, and not intended to be limiting. The present invention is intended to include, as insulating layer 20, at least one sublayer of a dielectric material capable of desorbing at least ten atomic percent hydrogen, and any number, zero or greater, of sublayers comprising a more dense insulating material.

Cathode structure 12 may be fabricated generally in accordance with the teachings of the above-cited Borel et al. ('161) patent, except that, in the case where insulating layer 20 comprises a single layer, HSQ is deposited using a spin-on process, and apertures 34 are etched through layer 20 using a C-F based dry chemistry. In the case where insulating layer 20 comprises a sublayer 20a of HSQ and at least one of sublayer 20b and 20c of $SiO_2$, the HSQ is deposited using a spin-on process and sublayers 20b and 20c are formed using a plasma vapor deposition. In this case, apertures 34 are also etched through sublayers 20a, 20b and 20c using a C–F based dry chemistry. The spin-on process used to deposit HSQ serves to planarize the device by filling in gaps which can build up during the depositions of the prior conformal coatings. This may be especially useful in regions of emitter structure 12 where ballast layer 17 my be discontinuous.

Referring again to FIG. 1, the display panel is assembled by sealing anode structure 10 and cathode structure 12 together at peripheral portions thereof by sealing material 32, illustratively comprising a glass frit rod. The reflow temperature of sealing material 32 may be in the range of approximately 400°–550° C. The heating process, wherein sealing material 32 reflows to seal structure 10 to structure 12, is conducted within a vacuum environment of approximately $10^{-7}$ torr, obviating the need for separately evacuating cavity 38 between anode structure 10 and cathode structure 12. During this heating process, or during a subsequent heating process, the HSQ is activated, causing a release of hydrogen within cavity 38.

Alternatively, the heating process, wherein sealing material 32 reflows to seal structure 10 to structure 12, may occur in an environment of an inert gas, preferably argon. After the sealing process in this case, the cavity 38 between anode structure 10 and cathode structure 12 is evacuated to a pressure of approximately $10^{-7}$ torr through an opening (not shown) in either emitter structure 12 or anode structure 10.

A field emission flat panel display device, as disclosed herein, including a hydrogen-rich, low dielectric constant material as the insulating layer between the gate and cathode electrodes of the cathode structure, and the methods disclosed for forming this insulating layer, overcome limitations and disadvantages of the prior art display devices and methods. First, by positioning an abundant source of hydrogen in extremely close proximity to the microtips, oxides are prevented from forming on the microtips. Furthermore, since the conventional $SiO_2$ gate insulating layer is replaced by a material of significantly lower dielectric constant, the RC time constant as well as the capacitive power dissipation are greatly reduced. Finally, the method by which the hydrogen-rich, low dielectric material is formed on the cathode structure, replacing the conventional $SiO_2$ layer with either a single layer of HSQ or a sublayer of HSQ coated by a sublayer of $SiO_2$, requires no substantial changes to the methods in current usage. Hence, for the application to flat panel display devices envisioned herein, the approaches in accordance with the present invention provide significant advantages.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims which follow.

What is claimed is:

1. A method of fabricating an emitter plate for use in a field emission device, said method comprising the steps of:

provide a substrate having a first conductive layer patterned on a surface thereof;

providing an insulating layer over said first conductive layer, said insulating layer comprising hydrogen silsesquioxane (HSQ);

depositing a second conductive layer on said insulating layer;

forming a plurality of apertures in said second conductive layer and extending through said insulating layer; and forming microtip emitters on said first conductive layer, each emitter formed within a corresponding aperture in said second conductive layer.

2. The method in accordance with claim 1 further including a step of providing a ballast layer on said first conductive layer.

3. The method in accordance with claim 1 wherein said step of providing an insulating layer comprises providing a plurality of sublayers, wherein at least one of said sublayers comprises hydrogen silsesquioxane and at least one other of said sublayers comprises silicon dioxide.

4. A method of fabricating a filed emission display device comprising the steps of:

(a) forming an emitter structure by
  (i) providing a substrate having a first conductive layer patterned on a surface thereof,
  (ii) providing an insulating layer over said first conductive layer, said insulating layer comprising hydrogen silsesquioxane (HSQ),
  (iii) depositing a second conductive layer on said insulating layer,
  (iv) forming a plurality of apertures in said second conductive layer and extending through said insulating layer, and
  (v) forming microtip emitters on said first conductive layer, each emitter formed within a corresponding aperture in said second conductive layer;

(b) forming a collector plate by
  (i) providing a substantially transparent substrate,
  (ii) forming a transparent anode electrode on said transparent substrate, and
  (iii) coating luminescent material on said anode electrode;

(c) positioning said emitter structure and said collector plate such that said microtip emitters are facing said luminescent material;

(d) evacuating the space between said emitter structure and said collector plate;

(e) sealing said emitter structure to said collector plate at peripheral regions thereof; and (f) heating said device to cause the release of hydrogen from said layer of dielectric material.

5. The method in accordance with claim 4 wherein said substep of providing an insulating layer includes providing a plurality of sublayers, wherein at least one of said sublayers comprises hydrogen silsesquioxane and at least one other of said sublayers comprises silicon dioxide.

6. The method in accordance with claim 4 further including a step of providing a ballast layer on said first conductive layer.

7. The method in accordance with claim 1 wherein said step of providing an insulating layer over said first conductive layer includes providing an insulating layer which comprises a first insulating sublayer including hydrogen silsesquioxane and a second, relatively thinner insulating sublayer of silicon dioxide, said second insulating sublayer being adjacent said second conductive layer.

8. The method in accordance with claim 1 wherein said step of providing an insulating layer over said first conductive layer includes providing an insulating layer which comprises a first insulating sublayer including hydrogen silsesquioxane and a second, relatively thinner insulating sublayer of silicon dioxide, said second insulating sublayer being adjacent said first conductive layer.

9. The method in accordance with claim 1 wherein said step of providing an insulating layer over said first conductive layer includes providing an insulating layer which comprises a first insulating sublayer including hydrogen silsesquioxane sandwiched between two relatively thinner insulating sublayers of silicon dioxide.

* * * * *